(12) United States Patent
Persson

(10) Patent No.: US 10,141,741 B2
(45) Date of Patent: Nov. 27, 2018

(54) ACTIVE FILTER FOR RESONANCE REDUCTION

(71) Applicant: COMSYS AB, Lund (SE)

(72) Inventor: Jonas Persson, Lund (SE)

(73) Assignee: COMSYS AB, Lund (SE)

(*) Notice: Subject to any disclaimer, the term of this patent is extended or adjusted under 35 U.S.C. 154(b) by 906 days.

(21) Appl. No.: 14/360,700

(22) PCT Filed: Nov. 22, 2012

(86) PCT No.: PCT/SE2012/051290
§ 371 (c)(1),
(2) Date: May 27, 2014

(87) PCT Pub. No.: WO2013/077801
PCT Pub. Date: May 30, 2013

(65) Prior Publication Data
US 2015/0102689 A1 Apr. 16, 2015

Related U.S. Application Data

(60) Provisional application No. 61/565,785, filed on Dec. 1, 2011.

(30) Foreign Application Priority Data

Nov. 25, 2011 (SE) ...................... 1151123

(51) Int. Cl.
*H02J 1/02* (2006.01)
*H02M 1/12* (2006.01)
(Continued)

(52) U.S. Cl.
CPC .............. *H02J 3/01* (2013.01); *H02J 3/1842* (2013.01); *H02J 3/24* (2013.01); *Y02E 40/22* (2013.01); *Y02E 40/40* (2013.01)

(58) Field of Classification Search
CPC ... H02J 3/01; H02J 3/24; H02J 3/1842; Y02E 40/22; Y02E 40/40
(Continued)

(56) References Cited

U.S. PATENT DOCUMENTS 4,067,766 A 1/1978 Larger
4,253,069 A 2/1981 Nossek
(Continued)

FOREIGN PATENT DOCUMENTS

CN 101277016 A 10/2008
CN 201699418 U 1/2011
(Continued)

OTHER PUBLICATIONS

International Search Report from PCT/SE2012/051290 dated Feb. 2, 2013.
(Continued)

*Primary Examiner* — Richard Tan
(74) *Attorney, Agent, or Firm* — Michael J. D'Angelo; Haug Partners LLP

(57) ABSTRACT

A control unit for an active filter for reducing resonance in an electric system is provided. The electric system comprises a power source distributing an alternating current to an AC conductor connected to a power consuming unit for distributing the AC to the power consuming unit. The active filter comprises a DC power source and a DC conductor connecting the DC power source to the AC conductor. The control unit comprises: a voltage measurement unit adapter to create a voltage signal on the basis of a measured voltage; a computing unit adapted to compute, using a biquadratic filter, a first compensating current on the basis of the voltage signal for reducing resonance in the electric system; and a
(Continued)

switching system placed between the DC power source and the DC conductor for creating the calculated first compensating current.

12 Claims, 8 Drawing Sheets

(51) Int. Cl.
  *H02M 1/14* (2006.01)
  *H02J 3/01* (2006.01)
  *H02J 3/18* (2006.01)
  *H02J 3/24* (2006.01)

(58) Field of Classification Search
  USPC .................. 307/105; 363/39, 40, 41, 44, 97
  See application file for complete search history.

(56) References Cited

U.S. PATENT DOCUMENTS

| | | | |
|---|---|---|---|
| 5,349,522 A | | 9/1994 | Konishi et al. |
| 6,038,152 A | * | 3/2000 | Baker .................. H02M 7/219 363/126 |
| 2006/0044850 A1 | | 3/2006 | Wu et al. |

FOREIGN PATENT DOCUMENTS

| | | |
|---|---|---|
| CN | 101478161 B | 5/2011 |
| EP | 2383857 A2 | 2/2011 |
| JP | H11 178214 A | 7/1999 |
| JP | 2002320329 A | 10/2002 |

OTHER PUBLICATIONS

Akagi, H. "New Trends in Active Filters for Power Conditioning," IEEE Transactions on Industry Applications, vol. 32, No. 6, Nov./Dec. 1996, pp. 1312-1322.

Ginnes, et al., "DSP Based Digital Controller for Shunt Active Power Filter to Improve Power Quality," International Journal of Recent Trends in Engineering, vol. 2, No. 7, Nov. 2009, pp. 92-94.

Le, Thanh-Nam et al., "Active Damping of Resonances in Power Systems," IEEE Transactions on Power Delivery, vol. 9, No. 2, Apr. 1994, pp. 1001-1008.

Routimo, Mikko et al., "Current Sensorless Control of a Voltage-Source Active Power Filter," Applied Power Electronics Conference and Exposition, 2005. APEC 2005. Twentieth Annual IEEE, vol. 3, pp. 1696-1702.

Tnani, S. et al., Output Feedback Control Strategy of Hybrid Filters, Electric Power Systems Research 76 (2006), pp. 343-359.

European Search Report from European Application No. EP12851560 dated Jun. 30, 2015, 8 pgs.

Alders, D et al., "Biquad-Filter for Active Damping of Low Frequency Oscillations in Two-Inertia Drive Systems," Electric Machines and Drives Conference, 2003, Piscataway, NJ, USA, IEEE, vol. 2, 2003, Jun. 1, 2003, pp. 1826-1831.

Sindu M R et al. "An ANNN Based Digital Controller for a Three-Phase Active Power Filter," Power System Technology and IEE Power India Conference, 2008, Oct. 12, 2008, pp. 1-7.

Smith, K.S. et al., "Active Filter Used as a Controlled Reactance to Prevent Harmonic Resonance in Interconnected Offshore Power Systems," IEE Proc.-Gener. Transm. Distrib., vol. 146, No. 4, Jul. 1999, pp. 393-399.

* cited by examiner

ACTIVE FILTER FOR RESONANCE REDUCTION

CROSS-REFERENCE TO RELATED APPLICATION

This application is the U.S. national phase entry of PCT/SE2012/051290, with an international filing date of 22 Nov. 2012, which claims the benefit of Sweden Application Serial No. 1151123-5, with a filing date of Nov. 26, 2011, and U.S. Application No. 61/565,785, with a filing date of Dec. 1, 2011, the entire disclosures of which are fully incorporated herein by reference.

TECHNICAL FIELD

The invention relates generally to a method and arrangement for reducing resonance using active filters.

BACKGROUND

An electrical system or power grid comprises energy generating units and energy consuming units or loads. The energy generating units (or in some instances energy transforming units) in an Alternating Current (AC) system typically generates three alternating currents each having a frequency of 50 or 60 Hz and having an offset relative to each other of 120°. To create a highly effective electrical system, the loads in the system should be purely resistive such that voltage and current waveforms are in phase and changing polarity at the same instance in each cycle. With purely resistive impedance all energy generated in the energy generating units will be turned into a useful and desired energy form at the load. However, in most cases, the impedance contains an inductive or capacitive component, which means that the current consumed is not always in phase with the supplied voltage of the alternating currents. The inductive or capacitive components stores energy temporarily in electric or magnetic fields which is then returned to the power grid a fraction of a second later in the cycle. This process results in a time difference between the current and voltage waveforms creating nonproductive power which increases the current. Furthermore, many electrical apparatus comprises active components that have a dynamically varying load, i.e. the load varies with time, such as electrical apparatus converting electrical power to mechanical work.

In a normal AC electric system, the voltage varies sinusoidally at a specific frequency, usually 50 or 60 hertz, known as utility frequency. A linear load, even if it comprises inductive or capacitive components, does not change the shape of the waveform of the current. However, the increased use of pulse controlled apparatuses such as rectifiers, variable frequency drives or arc discharge devices, such as a fluorescent lamps, electric welding machines, or arc furnaces introduces non-linear currents into the power grid. Since currents in these systems are interrupted by a switching action, the current contains frequency components that are multiples of the utility frequency, known as harmonics. As nonlinear currents flow through an electrical system and the distribution-transmission lines, additional voltage distortions are produced due to the impedance of the loads and creates a current waveform which can become quite complex, depending on the type of load and its interaction with other components of the system.

The harmonics are troublesome in many ways; one example is that electric motors experience hysteresis loss caused by eddy currents set up in the iron core of the motor, which are proportional to the frequency of the current. Since the harmonic frequencies are higher, they produce more core loss in a motor than the utility frequency, which results in increased heating of the motor core, which in turn shortens the life of the motor. Other problems with harmonics include overheating of cables and transformers, damage to sensitive equipment and tripping of circuit breakers.

Active filters capable of reducing the inductive and/or capacitive components and harmonics are known in the art, for example in U.S. Pat. No. 7,245,045 to Ström et al., which is hereby incorporated by reference. An active filter is in principle a microprocessor controlled amplifier which is connected to the power grid, and which is arranged to sense and compensate the load's current consumption with regards to frequencies which would not exist if the load was purely resistive.

Typically, an active filter comprises a main circuit with one or a series of fast switches for each phase and each switch is connected to a power source, such as a Direct Current (DC) power source which can accumulate electrical energy. The power grid's current provision and the load's current consumption are measured, and using Pulse Width Modulation (PWM) a compensating current is distributed to the power system by means of the switches.

The current flowing in the electrical system is measured by means of a current measurement unit, after which it is transferred to a computing unit that typically transforms the measured current into a digital frequency domain signal using Fast Fourier Transformation (FFT). The transformed signal is used to create an inverted digital signal which is distributed to the electrical system as a compensating current by means of Pulse Width Modulation (PWM).

The active filters of the art comprise a filter circuit arranged in order to reduce disturbances on the power grid generated by the active filter. Since the active filter in principle is an amplifier, and since the filter circuit comprises an inductor and a capacitor it may form a resonant circuit together with the electrical system which amplifies harmonic frequencies when resonance occurs. Resonance of the power grid may be detrimental by causing unwanted sustained and transient oscillations, which in turn may cause performance degradation. The power grid resonance at the resonant frequency may introduce substantial voltage fluctuation. The effects of resonance in an electrical system may be progressively worsening as higher frequencies are generated. Especially critical for creating resonant behavior is harmonics of 7:th and 11:th order.

Active filters in the art measures the current flowing between the AC power source and a power consuming device. Since the current flowing in the conductors of the electrical system is a result of the voltage in the power source and impedance of the consuming device, in accordance with Ohm's law I=U/R, the measurement of the current will be delayed in relation to fluctuations of the voltage level. On top of that, active filters use an A/D conversion based on Fast Fourier Transform (FFT) which requires relatively computing intense calculations in the microprocessor before a compensating current can be generated. Since the process of creating a compensating current is much too slow for handling resonance, the response of active filters in the art to resonant behavior in the electrical system has been to shut down the filter and deal with the frequencies generating the resonance by adding components to the electrical system.

SUMMARY

It is an object of the embodiments herein to address at least some of the problems and shortcomings outlined above by using a method and an arrangement as defined in the attached independent claims.

A control unit for an active filter for reducing resonance in an electric (or electrical) system is provided. The electrical system comprises a power source distributing an alternating current to an AC conductor connected to a power consuming unit for distributing the AC to the power consuming unit. The active filter comprises a DC power source, and a DC conductor connecting the DC power source to the AC conductor. The control unit comprises a voltage measurement unit adapted to (measure a voltage, e.g. at the AC conductor, and to) create a voltage signal on the basis of the measured voltage, a computing unit adapted to compute a (first) compensating current on the basis of the voltage signal for reducing resonance in the electric system, and a switch (or switching) system placed between the DC power source and the DC conductor for creating the calculated compensating current. By measuring the voltage a direct response is received which creates a system with a latency low enough to suppress resonance.

According to one embodiment of the control unit, the active filter further comprises a capacitor connected to the DC conductor and to ground, being adapted to lead frequencies other than the utility frequency of the electrical system to ground. The voltage measurement unit is adapted to be connected to a point between the AC power source and the capacitor. By measuring the voltage at this location an instantaneous value on the voltage level of potentially harmful currents is collected since the measured voltage level instantaneously reflects the voltage level of the power system (or electric system).

According to an embodiment of the control unit, the computing unit may use a biquadratic filter (and, optionally, additional filters and/or processing means/steps) to compute the first compensating current on the basis of the voltage signal. For example, the computing unit may apply the biquadratic filter (or a transfer function associated with the biquadratic filter) to the voltage signal, or to a signal derived based on the voltage signal. The biquadratic filter makes it possible to get a system with a high sample frequency by means of standard components. The biquadratic filter could have a sample frequency exceeding 100 kSa/s (samples per second) or exceeding 150 kSa/s.

According to one embodiment of the control unit, the voltage measurement unit is further adapted to measure the voltage of a second and third alternating current having an offset in relation to the first alternating current of substantially 120° (and 240° respectively, and to create a second and third voltage signal on the basis of the second and third measured voltages. The computing unit may be further adapted to compute a second and third compensating current on the basis of the second and third voltage signals. The DC power source may be adapted to receive current from the second and/or third alternating currents, and the switching system may be adapted to distribute the first compensating current to the first AC conductor (i.e. the AC conductor of the present embodiment may e.g. comprise a first, second and third AC conductor to which a first, second and third alternating current, respectively, is distributed, and the first compensating current may be distributed to the first of these AC conductors) by means of pulse width modulation.

According to an embodiment of the control unit, a current may be measured at the AC conductor, e.g. by a current measurement unit. A current signal may be created based on the measured current and the computing unit may be adapted to compute the first compensating current on the basis of the voltage signal and the current signal.

An active filter for reducing resonance in an electric system is further provided. The electrical system comprises a power source distributing an alternating current to an AC conductor connected to a power consuming unit for distributing the alternating current to the power consuming unit. The active filter comprises a DC power source and a DC conductor connecting the DC power source to the AC conductor. The active filter further comprises the control unit according to any of the embodiments herein.

A method of suppressing resonance in an electric system is further provided. The method comprises: measuring a voltage of (or at, or related to) a conductor supplying energy from an AC source to an energy consuming unit, creating a voltage signal on the basis of the measured voltage, computing a compensating current on the basis of the voltage signal, and creating a control signal (on the basis of the computed compensating current) for controlling a switching system to create the compensating current by means of pulse width modulation.

According to one embodiment, the voltage is measured between the conductor and a capacitor adapted to lead alternating currents with frequencies other that the utility frequency of the electric system to ground.

According to an embodiment, the step of computing a compensating current on the basis of the voltage signal may comprise using a biquadratic filter (e.g. by applying the biquadratic filter to the voltage signal or to a signal derived from the voltage signal). The biquadratic filter may have a sample frequency of more than 100 kSa/s or more than 150 kSa/s.

A control method for an active filter connected to an electric system is further provided. The control method comprises measuring a voltage at the electric system for deriving a current, comparing the derived current with a reference current, deriving a current error vector from the comparison and setting a current error threshold. The method further comprises creating a first current flow between a DC power source and the electrical system based on the current error vector using a first switching pattern, when the current error vector is below the threshold, and creating a second, different, current flow between the DC power source and the electrical system based on the current error vector using a second switching pattern, when the derived current is above the threshold. By providing a first and second switching pattern, a first and second type of response may be created, one which is energy efficient, and one which is powerful enough to suppress resonance.

According to one embodiment, the electrical system is an alternating current three phase system comprising alternating currents having an offset in relation to each other of substantially 120°, and wherein the threshold is an upper and lower threshold that applies to all of the three phases and thus creates a hexagonal threshold.

According to another embodiment, the first switching pattern is adapted to create as long switching cycles as possible by creating a current flow altering the direction of the current error vector within the hexagon towards the threshold furthest away.

According to yet another embodiment, the step of creating a second current flow between a DC power source and the electrical system comprises creating a current flow being the opposite to the current error vector such that the current error is reduced as efficiently as possible.

According to one embodiment, the step of deriving a current error vector is performed by using a biquadratic filter (e.g. by applying the biquadratic filter). The biquadratic filter makes it possible to get a system with a high sample frequency by means of standard components. The biquadratic filter could have a sample frequency exceeding 100 kSa/s or exceeding 150 kSa/s.

A control system for an active filter connected to an electric system is further provided. The control system comprises a measuring unit adapted to measure the voltage at the electric system for deriving a current, a comparing unit adapted to compare the voltage of the electric system with a reference value for deriving a current error vector, a control unit adapted to set a current error threshold, and a switch unit. The switch unit is adapted to create a first current flow between a DC power source and the electrical system based on the current error vector using a first switching pattern, when the current error vector is below the threshold, and create a second, different, current flow between the DC power source and the electrical system based on the current error vector using a second switching pattern, when the derived current is above the threshold. By providing a first and second switching pattern, a first and second type of response may be created, one which is energy efficient, and one which is powerful enough to suppress resonance.

According to one embodiment, the electrical system is an alternating current three phase system comprising alternating currents having an offset in relation to each other of substantially 120°, wherein the threshold is an upper and lower threshold that applies to all of the three phases and thus creates a hexagonal threshold.

According to one embodiment, the first switching pattern is adapted to create as long switching cycles as possible by creating a current flow altering the direction of the current error vector within the hexagon towards the threshold furthest away.

According to one embodiment of the control system, creating a second current flow between a DC power source and the electrical system comprises creating a current flow being the opposite to the current error vector such that the current error is reduced as efficiently as possible.

According to one embodiment of the control system, the step of deriving a current error vector is performed using a biquadratic filter (e.g. by applying the biquadratic filter).

Further possible features and benefits of this solution will become apparent from the detailed description below. Please note that any embodiment or part of embodiment as well as any method or part of method could be combined in any way.

BRIEF DESCRIPTION OF DRAWINGS

Some possible embodiments will now be described, by way of example, with reference to the accompanying drawings, in which.

DETAILED DESCRIPTION

An active filter is provided for reducing resonance in a power system by rapidly responding to resonant behavior and instantaneously providing a compensating current actively suppressing the resonance. The rapid response time is enabled by utilizing voltage measurement on a conductor between the electrical system to be monitored and compensated, and a capacitor adapted to attract alternating currents having frequencies above the utility frequency of the electrical system. By measuring the voltage at this location an instantaneous value on the voltage level of potentially harmful currents is collected since the measured voltage level instantaneously reflects the voltage level of the power system, in contrast to currents which depend upon a current build up over the impedance in response to a change in voltage.

The feeding of the compensating current, by means of switches and Pulse Width Modulation (PWM), is controlled based on time-domain signals, such as the measured voltages, and the computing power intense step of creating a Fast Fourier Transform (FFT) of such time domain signals is eliminated. This reduces latency and allows for a more rapid response to resonant behavior by more rapidly providing a compensating current actively suppressing the resonance A modulation method based on two thresholds is further provided. The two thresholds enables the system to react in a first, less powerful, way as long as the current error (deviation from the desired utility frequency current) is kept below the first threshold, which optimizes the switching for switching as few times per second is possible, which makes the active filter consume less energy and reduces the strain on the active components, which prolongs the life of the active filter. As the current error passes the first threshold, the filter responds very powerfully by ignoring the amount of switches that needs to be made, instead the compensating current created is substantially the opposite to the current error and thus reduces the current error as efficiently and rapidly as possible, which enables the system to react to resonances in the power grid excited by the load to be compensated.

In the following a detailed description of embodiments will be given with reference to the accompanying drawings. It will be appreciated that the drawings are for illustration only and are not in any way restricting the scope.

Figure 1:
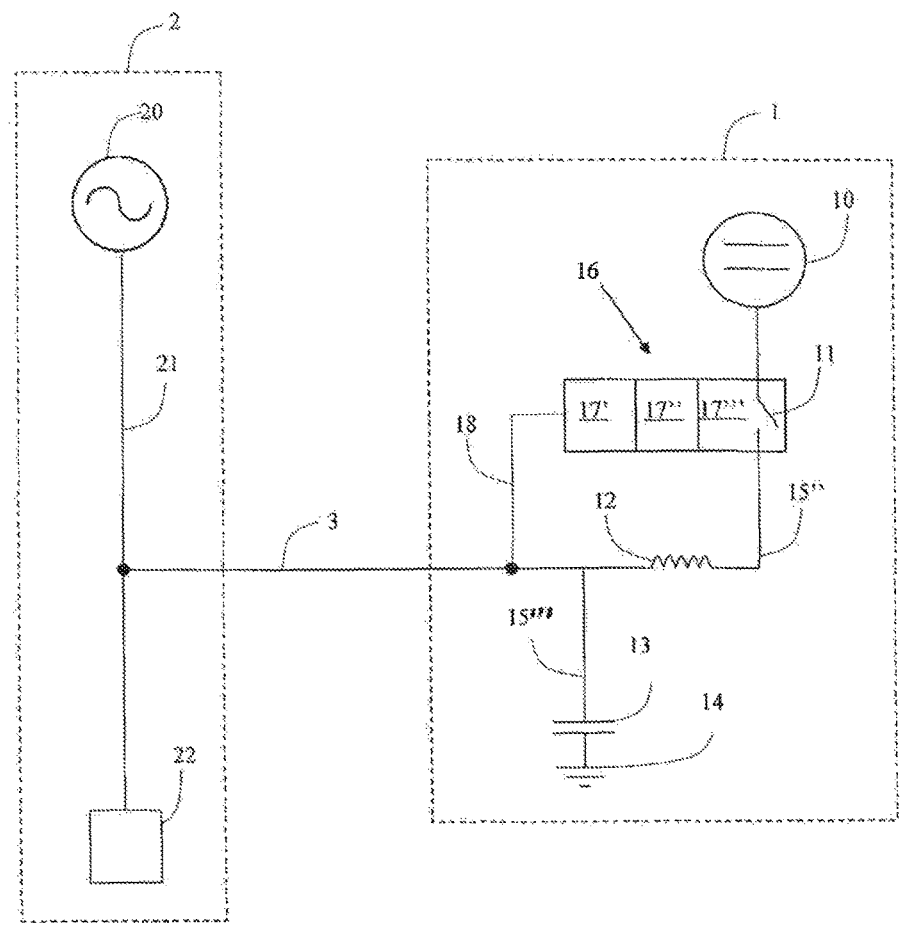
FIG. 1 is a system overview of an active filter.

FIG. 1 shows an active filter 1 for resonance compensation according to a first embodiment in which the active filter 1 is in connection with an electrical system 2. The electrical system 2 comprises an AC power source 20 distributing an alternating current to an Alternate Current (AC) conductor 21 for transfer to a power consuming unit 22. The power source 20 could be a generator producing the alternating current or a transformer used to transform the voltage level from a high voltage power grid level to consumption level. The power consuming unit 22 is for example an electrical machine transforming the electrical energy supplied from the power source 20 via the AC conductor 21 to mechanical work.

The active filter 1 is connected to the electrical system 2 via a conductor 3 placed between the active filter circuit 1 and the AC conductor 21, such that electrical current generated by the active filter 1 can be distributed to the electrical system 2 for improving the characteristics of the alternating current flowing in the AC conductor 21.

The active filter 1 comprises a Direct Current (DC) power source 10 connected to a switch 11 (or switching unit/system) in a control unit 16. The switch 11 creates a compensating current be means of Pulse Width Modulation (PWM) such that the average value of the current fed to the electrical system 2 is controlled by the switch 11 being open and closed at a fast pace. The longer the switch 11 is closed compared to the open periods, the larger the current supplied to the electrical system 2 becomes.

Via a second conductor 15", the switch 11 is connected to an inductor 12. The inductor 12 transforms the pulses generated by the switch 11 to a continuous signal by opposing the changes in current through it by developing a voltage across it proportional to the rate of change of the current in accordance with the mathematical formula U=LdI/dt. For an active filter configured for 100 A current the inductor typically is an inductor in the range 200-250 uH. The inductor 12 is in turn connected to the conductor 3 connecting the active filter 1 to the electrical system 2, such that the current created by the active filter 1 can be supplied to the electrical system 2. An additional conductor 15''' connects the conductor 3 to a capacitor 13 which in turn is connected to ground 14. The capacitor 13 is set at a value allowing alternating currents with a frequency at magnitudes above the utility frequency of the electrical current (for power grid applications typically 50-60 Hz) to pass to the ground 14 connection. This will effectively draw all frequencies that create loss in the electrical system 2 to the capacitor.

The control system 16 comprises a measurement unit 17' connected via a measurement conductor 18 to a point at the conductor 21; 3; 15''' between the AC power source 20 and the capacitor 13 such that the voltage level of the components of the alternating current with frequencies above the utility frequency, passing through the conductor 21; 3; 15''', will be measured with high accuracy and low latency.

The measured signal is transferred from the measurement unit 17' to a computing unit 17" adapted to compute a compensating current for reducing frequency components of the current other than the utility frequency, further details with relation to the computation/creation of the compensating current will be described with reference to FIGS. 3-4. The computing unit 17" is connected to a switching unit (or system) 17''', and the compensating current is realized by means of PWM by the switch 11 of the switching unit 17''', i.e. the compensating current is supplied from the DC source 10 and formed using PWM by the switching unit 17'''.

Figure 2:
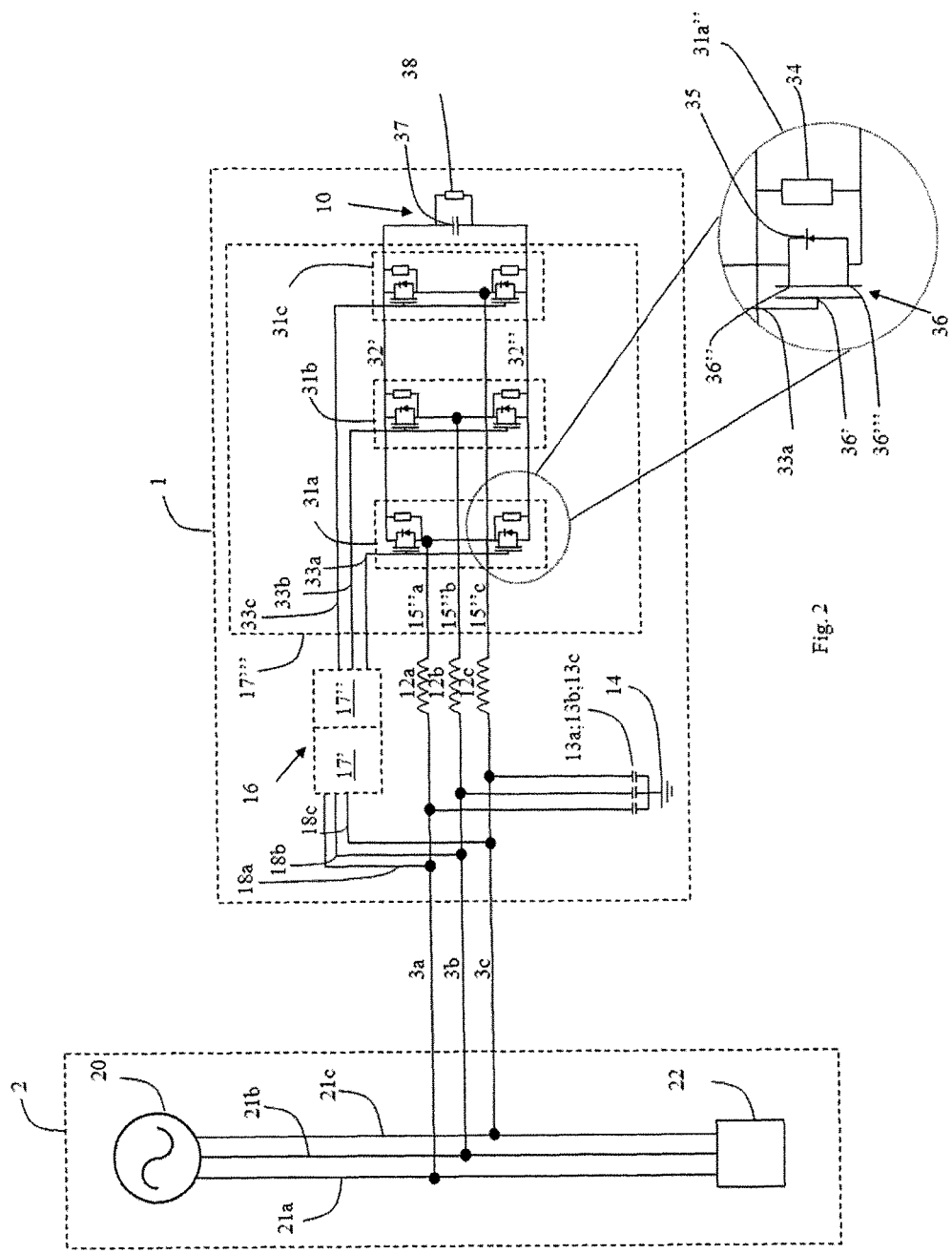
FIG. 2 is a system overview of an active filter for a three-phase system shown in further detail.

FIG. 2 shows a version of the electrical system 2 similar to the electrical system described with reference to FIG. 1. The main difference being that the system according to FIG. 2 is a three phase system, such as most power grids, comprising three alternating currents each with a phase offset of 120° and each connected to a three phase load 22, for example by means of a Δ or Y coupling. The electrical system comprises 3 conductors 21a; 21b; 21c for transferring electrical current from the AC source 20 to the load 22.

Just like in the circuit described under reference to FIG. 1, the active filter 1 comprises a direct current power source 10, here comprising a capacitor 37 in parallel with a resistor 38. The DC power source 10 is connected to a switching unit 17''' via conductors 32'; 32". According to the embodiment shown under reference to FIG. 2 the switching unit comprises transistor bridges 31a; 31b; 31c of pair-wise switches (one of which is enlarged and indicated by reference numeral 31a") one top for supplying positive voltages and one bottom for supplying negative voltages for each of the three phases. Each switch, such as 31a", comprises a transistor 36, a diode 35 and a snubber 34, connected in parallel with the collector 36" and emitter 36''' of the transistor. The transistor 36 is the active component that controls the PWM, the diode 35 directs current from the electrical system 2 to the DC accumulator when the voltage of the electrical system 2 exceeds the voltage of the DC accumulator. The snubber 34 protects the transistor from short voltage spikes that are created when the switch turns off the current by absorbing and reducing the voltage to manageable levels i.e. 50-100V. For each phase, the pair of switches are in one end connected to each other and to the conductors 15"a; 15"b; 15"c, and their other ends connected to the DC power source 10 by means of shared conductors 32'; 32". Both the specific design of the DC power source 10 and the switches are to be seen as examples of implementations. The skilled person realized that variations or alternatives to the designs are equally conceivable.

The gate 36' of the transistors 36 are connected to control leads 33a; 33b; 33c running from the computing unit 17" such that the switches operate on pulses from the computing unit 17" affecting the semiconducting properties of the transistor 36. In the embodiment described under reference to FIG. 2, the transistors are Insulated Gate Bipolar Transistors (IGBT) which are highly efficient and offers fast switching, however it is conceivable that the transistors are of a different type, such as Metal Oxide Semiconductor Field Effect Transistors (MOSFET).

The inductors 12a; 12b; 12c and capacitances 13a; 13b; 13c are furthermore adjusted such that the filter short-circuits harmonics and disturbances which are generated by the switching of the transistor bridges 31a; 31b; 31c are reduced/attenuated.

The control unit 16 of the active filter 1 encompasses a measuring unit 17' connected via measurement conductors 18a; 18b; 18c to a point at the conductors 3a; 3b; 3c between the AC power source 20 and the capacitors 13a; 13b; 13c such that the voltage level of the components of the alternating current with frequencies above the utility frequency, passing through the conductor 13a; 13b; 13c will be measured with high accuracy and low latency. The measurement unit 17' is connected to a computing unit 17" in which the Pulse Width Modulation (PWM) creating the control pulses to the switches is computed. The computing unit 17" comprises a processing unit, which may be a single CPU (Central processing unit), or could comprise two or more processing units. For example, the processor may include a general purpose microprocessor, an instruction set processor and/or related chips sets and/or special purpose microprocessors such as ASICs (Application Specific Integrated Circuit). The processor may also comprise board memory for caching purposes.

As in FIG. 1 the switch system 17''' is connected to inductors 12a; 12b; 12c which transform the pulses generated by the switch system 17''' to a continuous signal by opposing the changes in current through it by developing a voltage across it proportional to the rate of change of the current. The inductors 12a; 12b; 12c are in turn connected to conductors 3a; 3b; 3c connecting the active filter 1 to the electrical system 2, such that the current created by the active filter 1 can be supplied to the electrical system 2.

The measured signal is transferred from the measurement unit 17' to a computing unit 17" adapted to compute a compensating current for suppressing resonance and reducing frequency components of the current other than the utility frequency. Further details with relation to the computation/creation of the compensating current will be described with reference to FIG. 3-4. The computing unit 17" is connected to a switching system (or unit) 17''' that realizes the compensating current by means of PWM.

Further details of the operation of the computing unit and the creation of the control signal for controlling the switches will now be described under reference to FIGS. 3-4.

According to at least some embodiments, the compensating current (or currents) will be created by means of one or more digital biquadratic filters. Biquadratic filters are second-order recursive linear filters having a transfer function which is the ratio of two quadratic functions:

$$H(z) = \frac{b_0 + b_1 z^{-1} + b_2 z^{-2}}{a_0 + a_1 z^{-1} + a_2 z^{-2}}$$

According to the embodiments described under reference to FIGS. 1 and 2 the biquadratic filter is digitally implemented in the computing unit (reference number 17") and typically samples the voltage signal with a frequency above 100 kSa/s, preferably above 190 kSa/s, which means that sampling is more than 2000, preferably more than 3800, times faster than the utility frequency of the power system (or electric system) which is fast enough to react to resonant behavior of most harmonics in a frequency range that could cause problems. Furthermore, the biquadratic filter has a very low latency which makes the reaction to resonant behavior vary rapid, which enables efficient suppression of the resonant behavior.

According to the embodiments described with reference to FIG. 2, the DC power source does not generate any current of its own; it merely stores energy which it takes from the AC phases short periods of time such that the DC current should flow continuously. This means that the switches in the switching system (further described under reference to FIG. 2) needs to be set such that power is received from one AC phase and then distributed to another AC phase in accordance with a switching schedule which will be describes later.

The modulation will now be described in further detail.

Figure 3A:
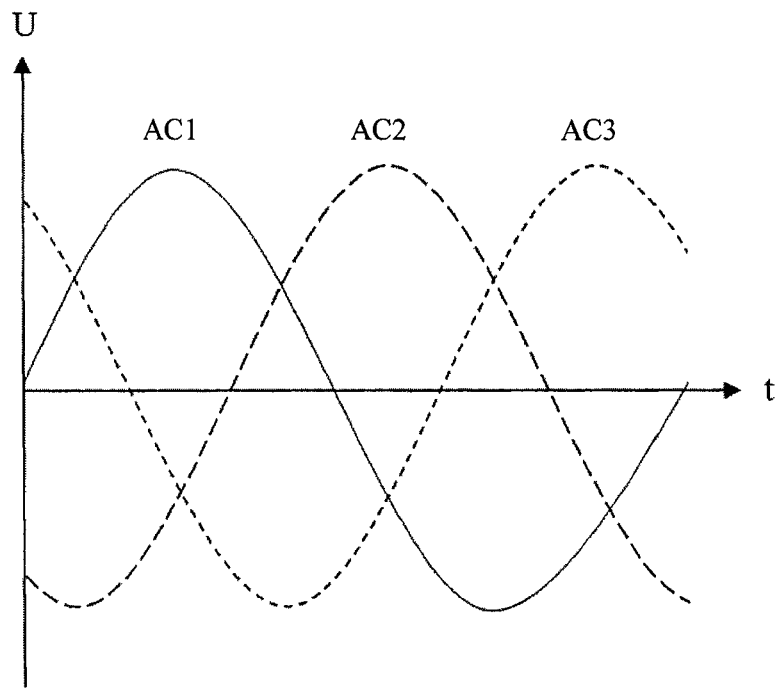
FIG. 3a shows a graph of the three currents with a 120° phase shift.

FIG. 3a shows the utility frequency of the three AC phases AC1, AC2, AC3 in the time/voltage domain. The modulation is hysteresis based such that the difference, or error, between the desired (reference) output current and the actual output current is calculated for the purpose of creating an error vector to be controlled.

Figure 3B:
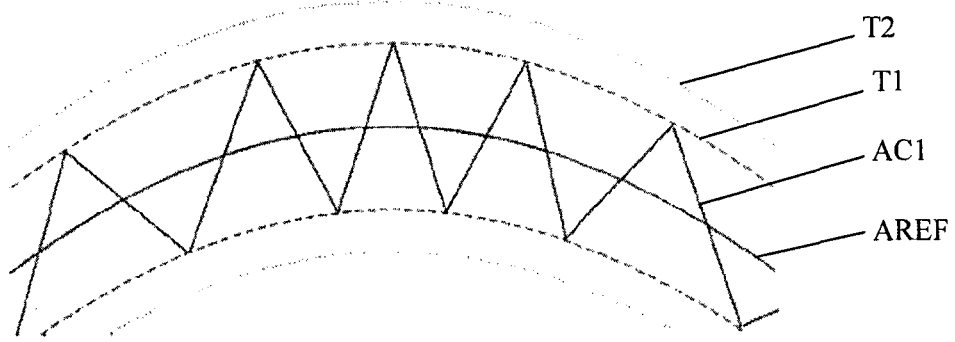
FIG. 3b shows a graph of a utility frequency when modulated in relation to a perfect sinusoidal reference signal.

FIG. 3b shows the actual utility frequency of AC1 when modulated in relation to the perfect sinusoidal reference signal AREF. The modulation operates by sending a compensating current out to the grid and thereby switching the direction of the error vector which keeps the error within the thresholds T1 and T2. In normal operations, the error vector should be kept within the first threshold T1 and the switching should be adapted such that each switch cycle is as long as possible, which keeps down the power consumption of the switches and prolongs the life of the switches.

Figure 4A:
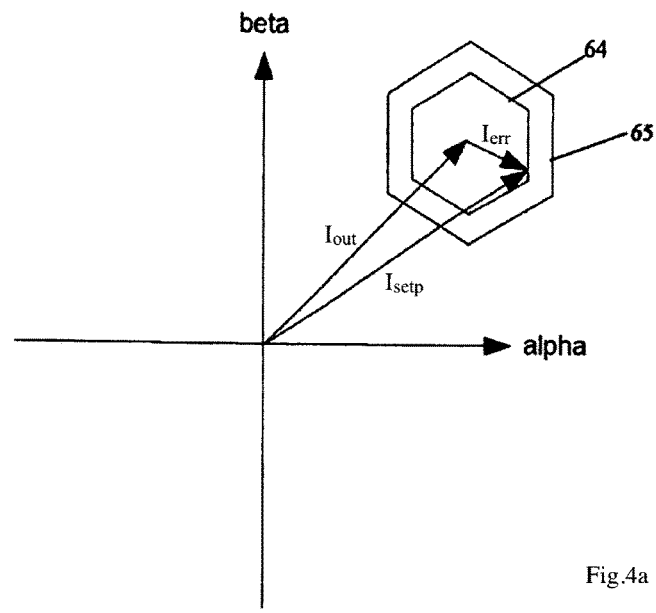
FIG. 4a shows a graph of a resulting error vector and a hexagon made of thresholds.

FIG. 4a shows the reference current $I_{setp}$ obtained by the control unit 16 by applying one or more biquadratic filters to the current in the electric system 2. The current on which the biquadratic filter is applied, may be obtained from the measured voltage. Alternatively, the biquadratic filter may be applied to the measured voltage and the reference current $I_{setp}$ may then be obtained from the resulting filtered voltage. The reference current $I_{setp}$ represents resonant components or other undesirable components, in the current in the electric system 2, which are to be removed or compensated for by the active filter. The biquadratic filters may have been tuned during configuration or setup of the active filter to ensure that resonant components end up in the reference current $I_{setp}$ while the utility frequency of the electrical system (e.g. 50 or 60 Hz) is attenuated by the biquadratic filters. FIG. 4a also shows the actual current $I_{out}$ delivered by the active filter (via the switching system 17''') to the electric system 2. The difference between the reference current $I_{setp}$ and the delivered current $I_{out}$ is shown as an error $I_{err}$ which is to be kept within a hexagon 64 of thresholds.

Figure 4B:
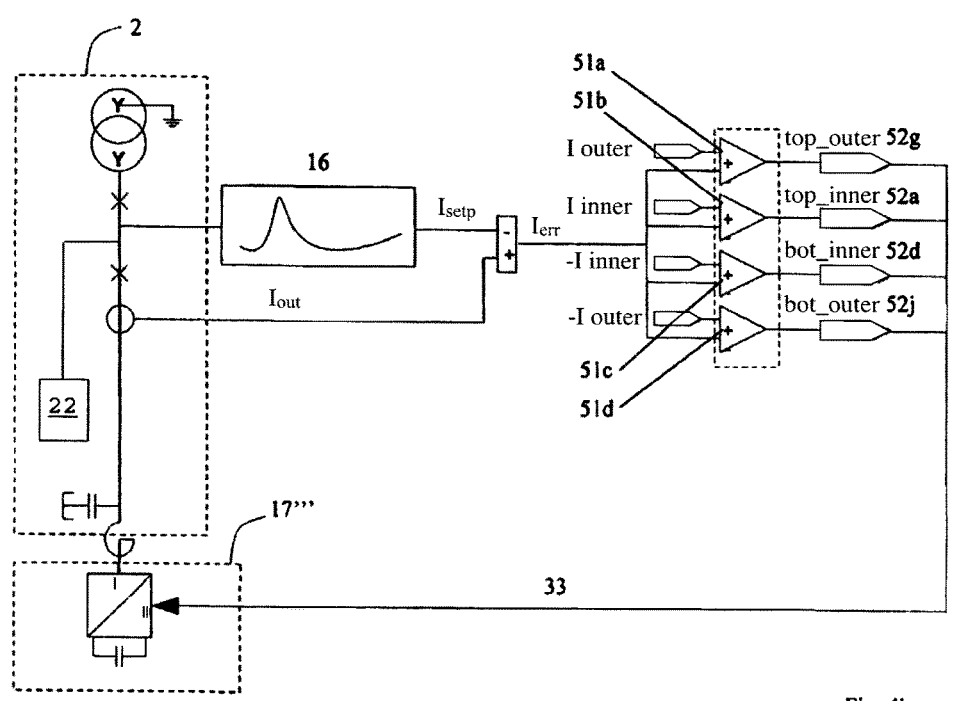
FIG. 4b is a system overview of an active filter.

FIG. 4b is a simplified system illustration showing the control unit 16 generating the reference current $I_{setp}$, which after comparison with the delivered current $I_{out}$ generates the resulting current error vector $I_{err}$. The resulting current error vector $I_{err}$ is then compared with the first and second thresholds in the comparators (51a-51d). In further detail the error vector $I_{err}$ is compared to the second (outer) threshold $I_{outer}$ in 51a, the first (inner) threshold $I_{inner}$ in 51b, the first negative (inner) threshold $-I_{inner}$ in 51c in the second negative (outer) threshold $-I_{outer}$ in 51d. The comparison results in a control signal 33 for controlling the switches such that the most suitable compensating current is created.

Figure 4C:
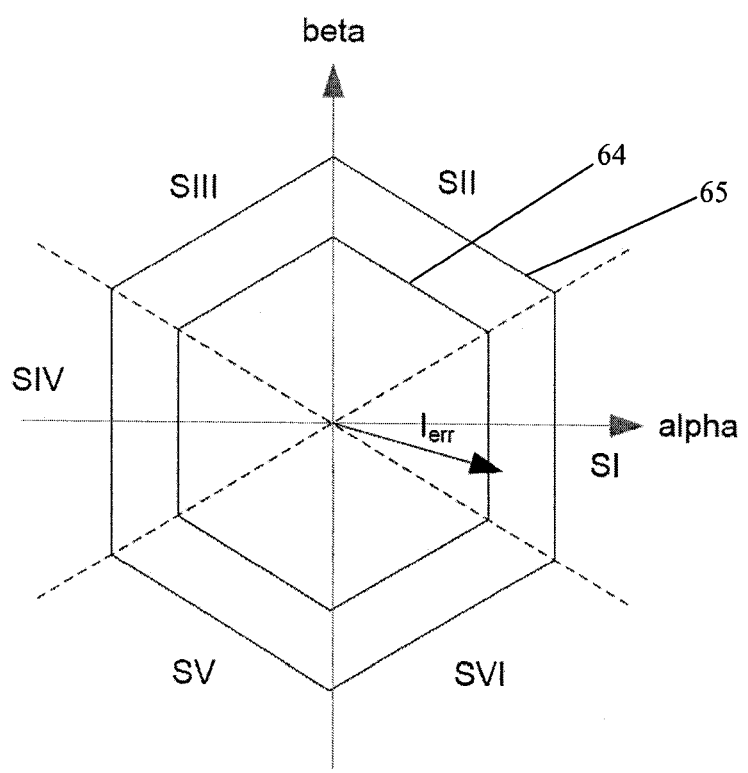
FIG. 4c is a graph of the error vector in relation to the hexagon thresholds.

FIG. 4c shows the inner 64 and outer 65 hexagon having an inner and outer threshold for the three phases (AC1, AC2, AC3) respectively. The thresholds can be controlled by a digital potentiometer and tuned depending on the system in which the active filter is placed, such that the response from the filter most efficiently suppresses the errors and whilst consuming as little energy as possible.

In some embodiments, the reference current $I_{setp}$ in FIG. 4b may be based on both a measured current and a measured voltage. Biquadratic filters may be applied to these measured signals (independently) and the reference current $I_{setp}$ may e.g. be formed as a sum of these contributions.

Figure 5A:
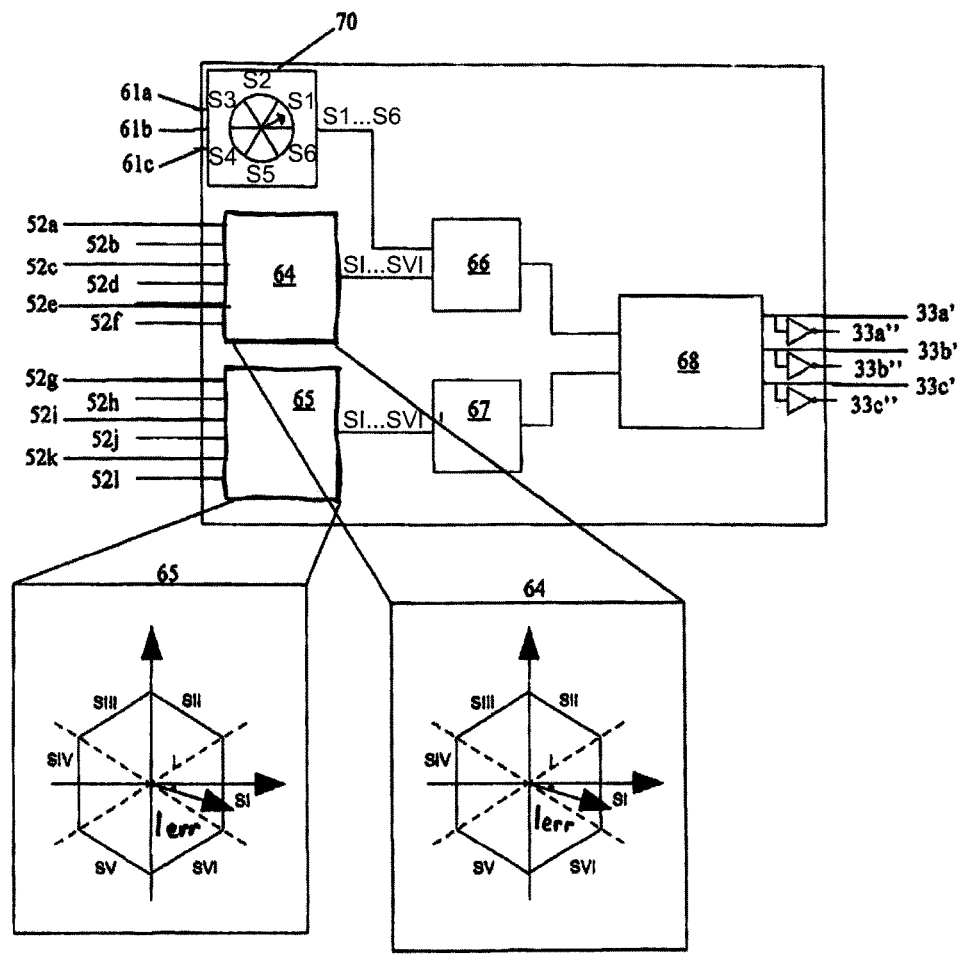
FIG. 5a is a system overview of an active filter showing the units in further detail.
Figure 5B:
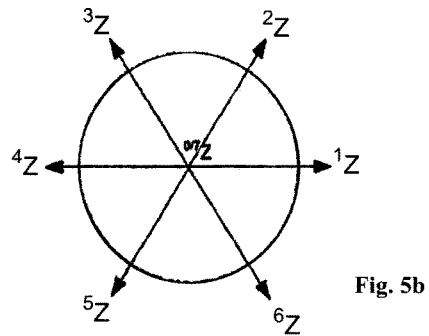
FIG. 5b is a graph explaining the switching states.

FIG. 5a shows a circuitry diagram of an embodiment of the modulation system with error vectors 61a, 61b, 61c of the three phases The error vectors with top or bottom values 52g-l are further provided as input to the outer sector detector 65 adapted to determine whether or not the resulting error vector remains within the boundaries of the outer hexagon 65, which places the resulting error vector $I_{err}$ in a sector S-SVI of the hexagon 65 and provides output in the form of the sector SI-SVI to a dynamic-state control unit 67 adapted to control the switch states (of the switches for example shown as 31a-31c in FIG. 2) in accordance with table 1 below, such that the switching is optimized for effectively pushing the resulting error vector $I_{err}$ back into the boundaries of the inner hexagon 64. The switching states of table 1 are realized in accordance with the switching state graph in FIG. 5b.

TABLE 1

| SI | SII | SIII | SIV | SV | SVI |
|---|---|---|---|---|---|
| $^4Z$ | $^5Z$ | $^6Z$ | $^1Z$ | $^2Z$ | $^3Z$ |

The required switching states are received at a control signal generating unit 68 determining if switches need to be made and creates the control signals 33a', 33a", 33b', 33b", 33c', 33c", received as input in the transistor bridges (31a-31c in FIG. 2) and controlling the transistors such that a compensating current is created by means of pulse width modulation.

Figure 6:
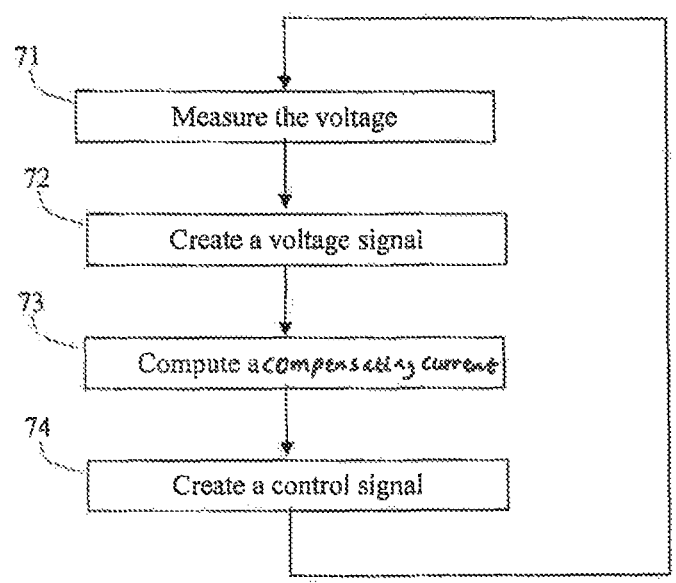
FIG. 6 is a flow chart explaining a method of suppressing resonance in an electric system.

FIG. 6 is a flowchart of a control method for an active filter according to one embodiment. The control method comprises the steps of measuring the voltage 71 at a point between a capacitor and the electrical system (as further disclosed under reference to FIGS. 1 and 2), creating a voltage signal at a control unit 72 representing the voltage of different frequencies in the alternating current, computing 73, at a computing unit, (based on the voltage signal and using a biquadratic filter) a compensating current for suppressing resonant behavior and the voltage level at frequencies other than the utility frequency, and creating a control signal 74 on the basis of the voltage signal for controlling switches for generating the compensating current using pulse width modulation (also further disclosed with reference to FIGS. 1-4).

Figure 7:
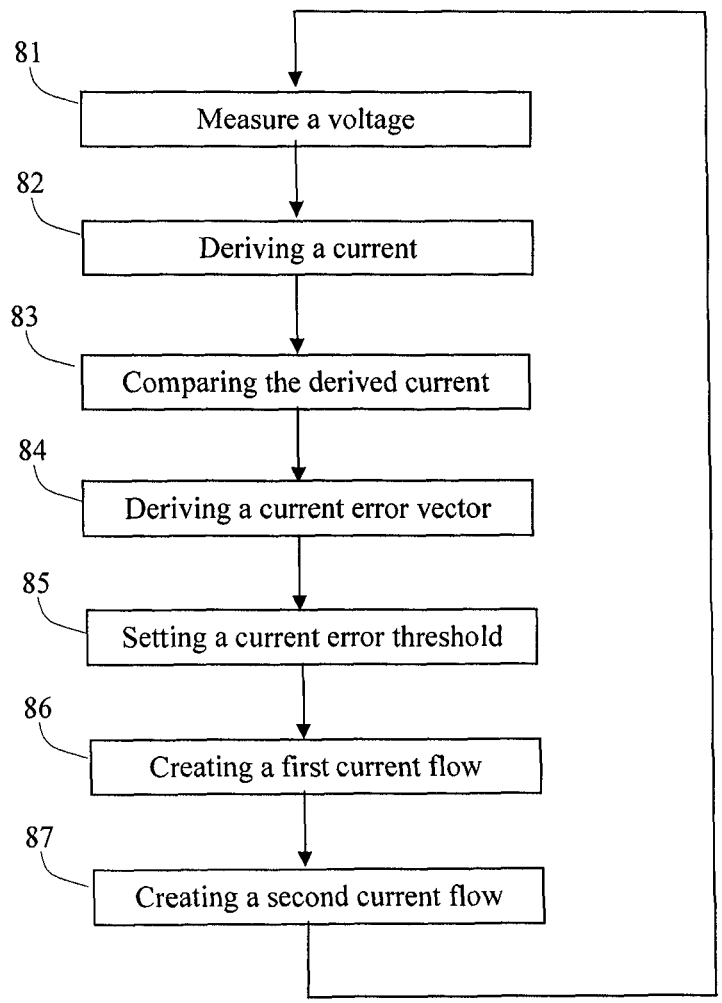
FIG. 7 is a flow chart explaining a control method for an active filter.

FIG. 7 is a flowchart describing a method of modulation according to one embodiment. The method comprises the steps of measuring a voltage (81) at the electric system for deriving a current (82). The voltage could be measured between a conductor of the electrical system and a capacitor adapted to lead alternating currents with frequencies other that the utility frequency of the electric system to ground, which creates a very good connection between troublesome frequencies and the measurement. The measured voltage is used to derive a current which is then compared (83) with a reference current, having a perfect sinusoidal wave form such that a difference between the reference current and the measured current can be derived (84), the difference being a current error vector. A current error threshold (85) is set in the control logic of the active filter for defining to what extent a current error can be accepted and defining what the response to the current error should be. The method then comprises the step of creating a first current flow (86) between a DC power source and the electrical system based on the current error vector using a first switching pattern, when the current error vector is below the threshold (which is further explained under reference to FIGS. 4c, 5a and 5b). The method further comprises the step of creating a second (87), different, current flow between the DC power source and the electrical system based on the current error vector using a second switching pattern, when the derived current is above the threshold.

Please note that any embodiment or part of embodiment as well as any method or part of method could be combined in any way. All examples herein should be seen as part of the general description and therefore possible to combine in any way in general terms.

The invention claimed is:

1. A control unit for an active filter for reducing resonance in an electric system, the electric system comprising a power source distributing an alternating current to an AC conductor, a power consuming unit connected to the AC conductor and receiving the alternating current from the AC conductor and the active filter comprising a DC power source and a DC conductor that connects the DC power source to the AC conductor, the control unit comprising:
   a voltage measurement unit adapted to create a voltage signal on the basis of a measured voltage;
   a computing unit adapted to compute, using a biquadratic filter, a first compensating current on the basis of the voltage signal for reducing resonance in the electric system, wherein the biquadratic filter has a sample frequency exceeding 100 kSa/s; and
   a switching system placed between the DC power source and the DC conductor for creating the computed first compensating current.

2. The control unit according to claim 1, wherein the active filter further comprises a capacitor connected to the DC conductor and being adapted to leads frequencies other than a utility frequency of the electrical system to ground, and wherein the voltage measurement unit is adapted to be connected to a point between the power source distributing an alternating current and the capacitor.

3. The control unit according to claim 1, wherein the computing unit applies the biquadratic filter to either the voltage signal or to a signal derived based on the voltage signal.

4. The control unit according to claim 1 wherein the voltage measurement unit is further adapted to measure a voltage of a second alternating current and a third alternating current having an offset in relation to the first alternating current of substantially 120° and 240° respectively, and create a second voltage signal and a third voltage signal on the basis of the second measured voltage and the third measured voltage, and wherein the computing unit is further adapted to compute a second compensating current and a third compensating current on the basis of the second voltage signal and the third voltage signal.

5. The control unit according to claim 4, wherein the DC power source is adapted to receive current from the second alternating current or the third alternating current, and wherein the switching system is adapted to distribute the first compensating current to the AC conductor by means of pulse width modulation.

6. The control unit according to any one of the preceding claims, wherein the computing unit is adapted to compute the first compensating current on the basis of the voltage signal and a current signal based on a measured current.

7. An active filter for reducing resonance in an electric system, the electric system comprising a power source distributing an alternating current to an AC conductor, a power consuming unit connected to the AC conductor and receiving the alternating current from the AC conductor and the active filter comprising:
   a DC power source;
   a DC conductor connecting the DC power source to the AC conductor; and
   a control unit comprising:
   a voltage measurement unit adapter to create a voltage signal on the basis of a measured voltage;
   a computing unit adapted to compute, using a biquadratic filter, a first compensating current on the basis of the voltage signal for reducing resonance in the electric system, wherein the biquadratic filter has a sample frequency exceeding 100 kSa/s; and
   a switching system placed between the DC power source and the DC conductor for creating the computed first compensating current.

8. A method of suppressing resonance in an electric system comprising an active filter, the method comprising:
   measuring a voltage of a conductor supplying energy from an AC source to an energy consuming unit,
   creating a voltage signal on the basis of the measured voltage,
   computing, using a biquadratic filter, a compensating current on the basis of the voltage signal, wherein the biquadratic filter has a sample frequency exceeding 100 kSa/s, and creating a control signal for controlling a switching system to create the compensating current by means of pulse width modulation.

9. The method according to claim 8, wherein the voltage is measured between the conductor and a capacitor adapted to lead alternating currents with frequencies other than a utility frequency of the electric system to ground.

10. The method according to claim 8, wherein the step of computing a compensating current the voltage signal comprises applying the biquadratic filter to the voltage signal or to a signal derived based on the voltage signal.

11. The method according to claim 8, wherein the step of computing a compensating current by filtering the voltage signal is performed using a biquadratic filter with a sample frequency of more than 150 kSa/s.

12. The method according to claim 8, wherein the compensating current is computed on the basis of the voltage signal and a current signal based on a current measured at the conductor.

\* \* \* \* \*